United States Patent Office 2,737,459
Patented Mar. 6, 1956

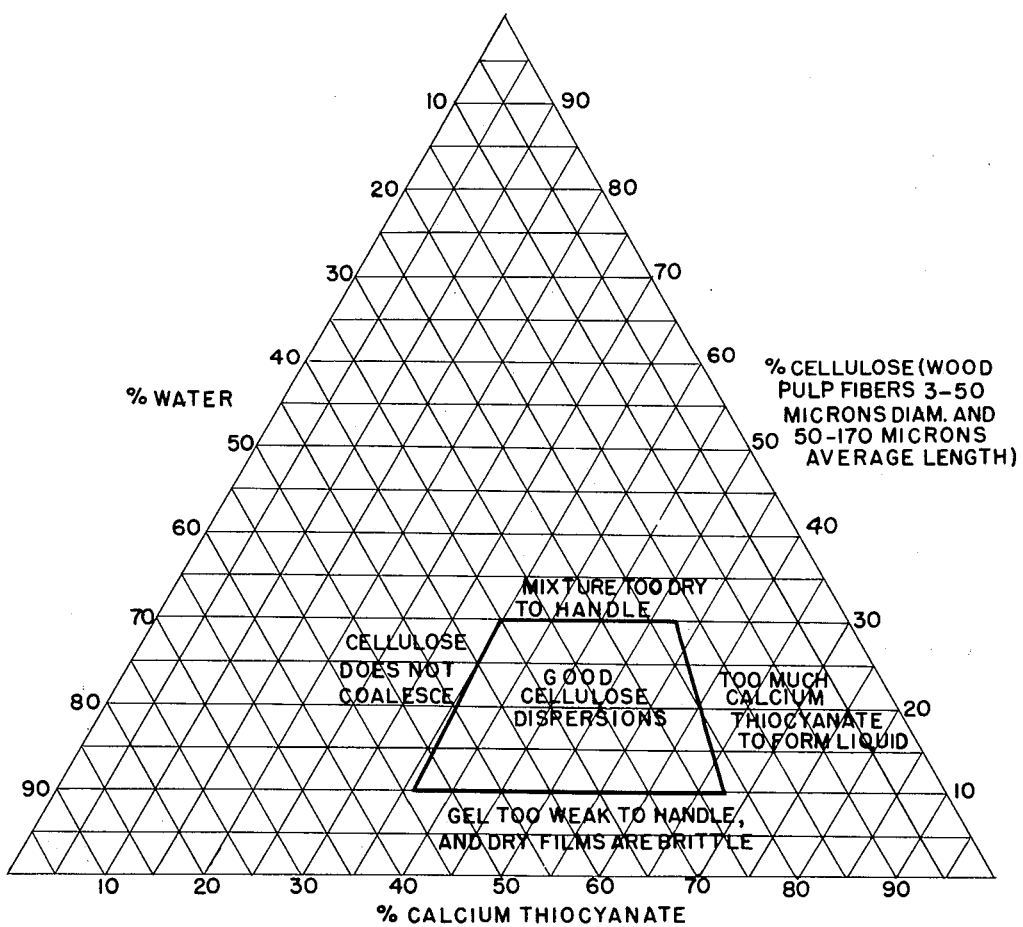

2,737,459

CELLULOSE COMPOSITIONS AND PREPARATION OF SHAPED ARTICLES THEREFROM

Max Fredrick Bechtold, Kennett Square, Pa., and James Herbert Werntz, Wilmington, Del., assignors to E. I. du Pont de Nemours & Company, Wilmington, Del., a corporation of Delaware Application April 21, 1952, Serial No. 283,356

4 Claims. (Cl. 106—194)

This invention relates to cellulose compositions and to a process of preparing shaped articles of cellulose by the use of such compositions.

The coversion of cellulose into tough, thin films and fine filaments has involved, heretofore, the preparation of solutions of the polymer or of derivatives thereof, and the subsequent separate step of forming such solutions into the desired shapes. As carried out heretofore, such procedures have been limited by the fact that excessively high viscosity has prevented or made impractical the preparation and handling of solutions that are both high in polymer content and high in the molecular weight of the contained polymer.

Attempts to lower the viscosity of cellulose solutions and speed the dissolving of the cellulose through the use of heat have heretofore caused material polymer degradation. Nevertheless, for the lack of a better method, one of these processes, the viscose process, has achieved great commercial success even though it involves chemical modification and degradation of the cellulose, as well as the dissipation of auxiliary chemicals. Consequently, it has been highly desirable to discover some practical method for forming films, filaments, and the like, that is not complicated by chemcial modification, does not involve sacrifices in the properties of fabricated articles due to lowering substantially the degree of polymerization of the cellulose, nor does not involve the consumption of other chemicals and the disposal of waste products thereof.

An object of the present invention is to provide a practical process for forming cellulose into filaments, films, and other shaped articles, that is not complicated by chemical modification, does not involve sacrifices in the properties of the fabricated articles due to substantial lowering of the degree of polymerization of the cellulose, and does not involve the consumption of other chemicals nor the disposal of waste products thereof. A further object is to provide new cellulose compositions and, particularly, such compositions adapted to be converted into various shaped articles without involving the aforementioned objections encountered heretofore in the conversion of cellulose to films, fibers, and the like. Other objects will be apparent from the description of the invention given hereinafter.

The above objects are accomplished according to the present invention by preparing a cellulose composition nonpourable at 25° C. and comprising, by weight, 1 to 3 parts of cellulose uniformly dispersed in 9 to 7 parts of an aqueous solution of calcium thiocyanate of 40% to 75% concentration, the cellulose having a degree of polymerization of at least 175, being water-insoluble, and having at least 2.5 free hydroxyl groups per glucose unit, and the weight ratio of calcium thiocyanate to cellulose being preferably at least 1.15:1, and then forming this cellulose composition into a shaped article such as a film, filament, or the like, at a temperature of 85° C. to 150° C. under pressure. Preferably, the cellulose composition comprises 1.1 to 1.5 parts of cellulose and 8.9 to 8.5 parts of an aqueous solution of calcium thiocyanate of 50% to 65% concentration; especially favorable results are obtained when the cellulose is dispersed in an aqueous solution of calcium thiocyanate of 55% to 60% concentration. Also, the preferred procedure includes the step of immersing the shaped article in a coagulating bath and thereafter washing it with water.

While various modifiers are not excluded from the compositions of this invention, these compositions essentially comprise 10% to 30% of cellulose, by combined weight of cellulose and aqueous solution, uniformly dispersed in an aqueous solution of calcium thiocyanate of 40% to 75% concentration, the cellulose being characterized as above. Preferably, a concentration of 11% to 15% of cellulose in the aqueous solution of calcium thiocyanate is used.

The cellulose compositions of this invention are solid or, more accurately, nonpourable at 25° C. although having at elevated temperature unexpectedly low viscosities in view of the concentration and degree of polymerization of the cellulose therein. They can be particulate cellulose dispersions with the cellulose particles either unswollen or swollen to a certain extent by the imbibition of fluid but in either case these dispersions are nonpourable at 25° C. Also, they can be at 25° C. nonpourable gels which are at least translucent and can be substantially transparent. The particulate dispersions are capable of being readily converted to such gels or the gels may be formed directly without separating the composition out as a particulate dispersion. Also, by the use of apparatus such as a screw extruder, the cellulose can be uniformly dispersed in the aqueous calcium thiocyanate solution and the resulting composition directly extruded into a shaped article such as a film, filament, or the like.

Depending primarily upon the particle size of the cellulose used, the present invention will be carried out in one of two general methods. In one method, a particulate cellulose dispersion is formed by uniformly dispersing the cellulose in the aqueous calcium thiocyanate solution at approximately room temperature and then this dispersion is subsquently formed into shaped articles under heat and pressure. This method is more particularly of use when cellulose in fine particle size is available. In the other method, a composition which will give on cooling to 25° C. a nonpourable, at least translucent gel is formed by mixing, usually by viscous milling, the cellulose at elevated temperature. The composition can be made at one time and formed into a shaped article at another time or, as previously mentioned, the composition can be made and directly extruded into a shaped article by the use of a screw extruder or the like.

The first method of carrying out this invention, namely, separate formation of a particulate dispersion, is not restricted to the use of cellulose of any given particle size but, as a partical matter, it generally will be used with a cellulose of fine particle size both because the cellulose particles must be fully coalesced under heat and pressure in the course of forming the shaped article which is more readily accomplished with cellulose particles of small size, and also because the shaped article is usually formed by forcing the dispersion through an orifice or slit which could be easily plugged up, at least to the extent of interfering with the operation, if relatively large cellulose particles were used. However, in the formation of a film by pressing a particulate dispersion between two heated platens, for example, relatively large cellulose particles would not necessarily be too disadvantageous.

The particulate cellulose dispersions of this invention are readily prepared by mixing the cellulose particles and aqueous calcium thiocyanate solution until a uniform dispersion is obtained, either simply by shaking the two together or by use of a high speed mixer such as the "Waring blendor." This can be done at room temperature (approximately 25° C.) although moderately elevated temperatures are not excluded. The dispersion may not be nonpourable immediately upon mixing but it becomes so upon standing.

In general, cellulose particles having all dimensions within the range of 0.1 to 300 microns are well adapted for preparation of these particulate dispersions and particles within the range of 1 to 200 microns are preferred. Chemically purified wood pulp having fibers 1 to 50 microns in diameter and an average length between 35 and 170 microns are particularly suitable. Cellulose of the indicated particle size can be obtained by grinding cotton linters or wood pulp cold in a micropulverizer or in an attrition mill of the type known as a "Micronizer."

The term "particulate dispersion" is used herein in the normal and accepted meaning of the term "particulate dispersion" when referring to polymer dispersions. That is, particular polymer dispersions are suspensions of polymer particles in a medium that is not a solvent for the polymer at the temperature involved. Thus, particulate dispersions of polymer particles are fundamentally different from molecular dispersions of polymer molecules, which latter dispersions are solutions.

Although these particulate cellulose dispersions are adapted to be directly formed under heat and pressure into shaped articles, if cellulose particles of the preferred size range are used, these dispersions can generally be converted into nonpourable gels simply by heating to about 100° C. for a short period and cooling. Such a procedure is followed in certain of the examples given hereinafter, e. g., Examples I, II, XI, XII, and XIX. The gel thus obtained can be readily formed into a film or filament.

The second method of carrying out this invention involves uniformly dispersing the cellulose in the aqueous calcium thiocyanate solution under conditions that result in an at least translucent mass which at 25° C. is a nonpourable gel. This is accomplished readily by viscous milling the cellulose and the aqueous calcium thiocyanate solution in a Banbury mixer or other apparatus which will subject the mixture to a milling action, at a temperature of at least 75° C. until an at least translucent mass results. The thorough milling action such as obtained by the use of a Banbury mixer is particularly advantageous when coarse or fibrous particles of cellulose are used in order to avoid inadequate homogeneity of the composition that might lead to plugging of spinnerettes or film casting slots or even in the formation of lumpy, hazy or incompletely coalesced films. If cellulose of fine particle size is used, the milling can be relatively mild but a temperature of at least 75° C. should be used.

Any temperature can be used in the viscous milling from 75° C. up to the boiling point of the calcium thiocyanate solution at atmospheric pressure, or even higher temperatures if the milling is carried out under superatmospheric pressure. Milling times of 10 to 30 minutes at 110° C. to 230° C., the preferred temperature range, are usually adequate. The milling period in general is longer at the lower milling temperatures, especially with coarse or fibrous cellulose. An advantage of this invention is that the process may be carried out without greatly reducing the degree of polymerization of the cellulose and the milling should not be continued for such a period that the degree of polymerization of the cellulose is reduced more than 30%, the formation of a homogeneous, at least translucent mass being easily obtained before milling to this extent. Upon cooling to the neighborhood of 25° C., the milled mass will become a nonpourable gel which is at least translucent if not substantially transparent.

As in the case of the particulate dispersions, the nonpourable gels are readily converted into strong, tough, shaped articles such as fibers and films, by pressing, calendering, or extruding at a temperature of 85° C. to 150° C. under superatmospheric pressures, that is, from about 10 lb./sq. in. up. Rather than mill the cellulose and aqueous calcium thiocyanate solutions and then let it cool to form a nonpourable gel which is subsequently shaped under heat and pressure, the hot milled mass may be shaped under heat and pressure without allowing it to cool down. It is practical and a preferred mode of carrying out the invention to mill the cellulose and aqueous calcium thiocyanate solution in a screw extruder wherein it is viscous milled to an at least translucent mass and directly extruded into the shaped article desired.

Fibrous cellulose such as wood pulp, cotton linters, or long cotton fibers having fiber diameters between 1 and 50 microns, the length of fiber not being particularly important, are well adapted for use in this second method of carrying out the invention but this second method is by no means limited to cellulose of such particle size. Finely pulverized cellulose such as is particularly advantageous in the first method described, may be used here but it is generally more expensive and the advantage gained from the small particle size ordinarily would not offset the increased cost of such material.

The use of chemically treated cellulose is advantageous in this invention. Such cellulose includes fibers and films regenerated from viscose and water-insoluble, low-substituted derivatives of cellulose with monofunctional reactants, and having at least 2.5 free hydroxyl groups per glucose unit, e. g., low-substituted methylcellulose, ethylcellulose, cyanoethylcellulose, cellulose acetate, and the like. Also, cotton linters or wood pulps which have been activated by contact with a dilute solution of a strong acid, preferably a mineral acid such as dilute aqueous nitric acid or dilute aqueous hydrochloric acid are very useful. A particularly useful form of activated cellulose is that obtained by contacting cotton linters or wood pulp with a solution of sulfuric acid in glacial acetic acid, the quantity of sulfuric acid in the solution amounting to approximately 1.5% by weight of the cellulose, and then reacting the cellulose with an alcoholic solution of an alkali such as potassium hydroxide, to remove any acetate groups which may have been formed by the acetic acid treatment. Fibrous cellulose that has been pretreated with strong mineral acids and fibrous low-substituted cellulose derivatives both give bright films of good clarity but the mineral acid-treated fibrous cellulose is preferred because of its low cost and superior film properties.

The chemically treated celluloses discussed above are adapted for use in either of the general methods of carrying out the present invention, the one selected normally being determined by the particle size of the chemically treated cellulose. Usually, the chemically treated celluloses are available in fibrous form of a particle size rather large for use in the preparation of particulate cellulose dispersions so that more frequently these chemically treated celluloses will be used in that method of carrying out the invention wherein the cellulose is viscous milled to give a mass which at 25° C. forms a nonpourable gel.

Regardless of whether the films, fibers, or other shaped articles are prepared by one or the other method of carrying out this invention or whether the cellulose is chemically treated or not, the resulting shaped articles can be washed free of calcium thiocyanate with water but during the washing step they are quite weak and opaque. However, if the film, filament, or the like, is immersed in a coagulating bath before being washed, the strength and clarity of the gel article is greatly improved. Accordingly, it is preferred to immerse the gel article in a coagulating bath for a short time, the optimum time depending on the thickness of fiber, film, or the like, before washing out the calcium thiocyanate with water. Times ranging from 1 minute or even less to an hour or more are satisfactory.

Various types of coagulating baths can be used to improve the properties of the gel structures. Examples of suitable coagulating baths include aqueous salt solutions such as, for example, 25% sodium chloride, 25% calcium chloride, 35% magnesium chloride, 50% sodium formate, 30% sodium acetate, and other baths such as 50% aqueous glycerol, 50% aqueous acetic acid, absolute alcohol, 2-B denatured alcohol, glycerol, methanol, and acetone. Twenty-five per cent aqueous sodium chloride is the preferred coagulating bath since it forms films of greater clarity and strength than many of the others and, also, since calcium thiocyanate can be recovered easily from solutions containing these two salts. Aqueous solutions of other salts or other compounds besides those mentioned above can also be used but they do not produce films of as good clarity and strength.

After the gel fibers or films have been immersed in the coagulating bath for a length of time such that they do not weaken appreciably when transferred to water (determined by separate experiment for each fiber diameter or film thickness), they are next washed in water until they are substantially free of calcium thiocyanate and any other material, such as sodium chloride, picked up from the coagulating bath. Usually three to four changes of water are sufficient to obtain washings no longer giving a test for thiocyanate ions with a ferric salt solution. The washed films or fibers are then dried at ordinary or moderately elevated temperatures, e. g., at temperatures of preferably 25° C. to 50° C. and at 40–90% relative humidity when unsoftened. It is convenient to remove excess liquid from gel films by pressing the film on a polished plate with a squeegee. The shrinkage of the fibers or films on drying can be controlled by drying them under tension. The gel fibers or films can be drawn at ordinary temperatures and then dried under tension to give higher tenacity products.

The invention is further illustrated by the following examples in which proportions of ingredients are expressed in parts by weight and all processing steps are conducted at room temperature (about 20–30° C.), unless otherwise stated.

EXAMPLE I

Ten parts of finely divided chemically purified wood cellulose fibers of from 3 to 50 microns in diameter and 50 to 170 microns average length are uniformly dispersed in 90 parts of a 56.7% by weight aqueous solution of calcium thiocyanate by shaking. After being allowed to stand for 6 hours, there is obtained a nonpourable, particulate cellulose dispersion. This dispersion is warmed to 110° C. to yield a dough which gels on cooling. About 3 g. of this friable gel is pressed between two 6" x 6" sheets of aluminum foil in a hydraulic press, the platens of which are at a temperature of 100° C. The pressure is released and a rubbery film separates from the aluminum foil spontaneously upon immersion in water. There is obtained, after washing, a translucent gel cellulose film. This gel film is then immersed in 20% aqueous glycerol for 0.5 hour, squeegeed and dried on the squeegee plate to form a translucent, tough, pliable film.

EXAMPLE II

Another portion of the cellulose gel formed from the particulate cellulose dispersion of Example I is placed in a cylinder heated at 125° C. The bottom of this cylinder is fitted with a spinnerette having a single opening 32 mils in diameter. The top of the cylinder is fitted with a piston ⅛ square inch in area and sufficient weight applied to produce a total pressure on the material of 53 lb./sq. in. A monofil extrudes from the bottom of the cylinder; it is elastic and substantially clear. After being washed in water and dried taut in air for 0.5 hour, the elastic fiber is transformed to a substantially clear, stiff, tough, shrunken filament of 15,000 lb./sq. in. tensile strength.

EXAMPLE III

Ten parts of the finely divided cellulose fibers of Example I are mixed uniformly in a mortar with 60 parts of aqueous 56.7% calcium thiocyanate solution and the dispersion allowed to stand for 24 hours. The resultant particulate cellulose dispersion is in the form of a friable paste which is pressed between aluminum foils for 3 minutes at 200 lb./sq. in. pressure in a hydraulic press whose platens are heated at 115° C. After stripping the aluminum foils from the resultant rubbery film, it is contacted with a 50% aqueous solution of sodium acetate trihydrate coagulating bath for 10 minutes, then washed in water and finally dried in air while held in a taut condition. The resulting dry film is translucent and tough, and has a tensile strength of 8000 lb./sq. in.

EXAMPLE IV

Seventy-five parts of the finely divided cellulose of Example I, having a degree of polymerization (DP) of 410, and 454 parts of an aqueous solution containing 56.7% calcium thiocyanate, are cooled to 5° C. and stirred for 3 minutes in a high-speed mechanical mixer. The resultant slurry sets up to a nonpourable particulate cellulose dispersion in the form of a friable paste when it is warmed to room temperature i. e., 25° C. When heated at 100° C. for 20 minutes, then cooled, it forms a stiff gel. This gel is formed into films by placing it in a screw extruder having a two-inch diameter screw six inches long operating at 16 R. P. M. The gel is extruded through a die having an opening five mils (0.005 inch) wide and three inches long. The gel passes through several filtering screens immediately before entering the die. The pressure on the gel is controlled by the number of screens used in the screen pack; the larger the number the greater is the pressure obtained. The die and the screw housing are heated at 135° C. and a rubbery gel film is extruded into a coagulating bath consisting of 25% aqueous sodium chloride. After removal from this coagulating bath, the gel film is washed in water, squeegeed on a chromium plate, clamped in a frame and air-dried in a taut condition. The resulting dry films are translucent and about five mils in thickness. The dry film at 50% relative humidity (RH) has a tensile strength of 7200 lb./sq. in., a modulus in tension of 456,000 lb./sq. in., and an elongation at break of 18%.

EXAMPLE V

A particulate cellulose dispersion in the form of a friable cellulose paste is prepared in exactly the same manner as described in Example IV. This paste is calendered between rolls heated to 104° C. while replacing the water as it evaporates. After a rubbery gel film is formed, the rolls are cooled and the film stripped from the rolls. This film is soaked in 25% aqueous sodium chloride and then washed in water and air-dried. The air-dried film is translucent.

EXAMPLE VI

One part of the finely divided cellulose fibers described in Example I and 9 parts of calcium thiocyanate trihydrate are mixed together by heating on a steam bath for two hours. A brown, rubbery paste is formed. This paste is pressed between glass platens at 135° C. for 30 seconds. The resulting gel film is strong and translucent.

EXAMPLE VII

Three parts of the finely divided cellulose fibers of Example I and 7 parts of calcium thiocyanate trihydrate are mixed together while heating on the steam bath for about one hour. A dark gray brittle composition is obtained. A film is prepared by pressing this cellulose composition between glass platens at 135° C. for 45 seconds. The film is then stripped from the platens, immersed in 25% aqueous sodium chloride and washed with water. The resulting gel film is strong and cloudy.

EXAMPLE VIII

Twenty-five parts of the finely divided cellulose fibers of Example I and 75 parts of aqueous 56.7% calcium thiocyanate are cooled to −10° C. and mixed by shaking in a glass vessel. On warming to 25° C., the dispersion becomes a light brown granular solid product. This particulate cellulose dispersion is pressed between platens having chromium plated surfaces at 120° C. for three minutes at a pressure of 882 lb./sq. in. The rubbery gel film that forms, is stripped from the platens and immersed in 25% aqueous sodium chloride and then washed with water. The gel film is squeegeed on a chromium plate, clamped in a frame and air-dried in a taut condition. The resulting dry film is about three mils thick and is translucent. This film at 50% R. H. has a tensile strength of 14,000 lb./sq. in., a modulus in tension of 900,000 lb./sq. in., and an elongation at break of 8%. The film also has a tear strength (as determined by the modification of the Elmendorf method described in U. S. Patent 2,445,333) of 37 g. dry and 30 g. wet.

EXAMPLE IX

Twenty-five parts of the finely divided cellulose fibers of Example I and 75 parts of aqueous 47.2% calcium thiocyanate solution are cooled to −10° C. and mixed by shaking in a glass vessel. On warming to 25° C., the resultant particulate dispersion takes the form of a light colored, moist powder. A film is prepared from this moist powder by pressing between platens having chromium-plated surfaces at 120° C. for three minutes at a pressure of 392 lb./sq. in. The weak gel film formed is stripped from the plates and immersed in 25% aqueous sodium chloride solution before washing with water. The washed gel film is squeegeed on a chromium plate, clamped in a frame and air-dried in a taut condition. The film shrinks and pulls away from the frame, and when dry is translucent.

The addition of 10% (based on the weight of cellulose) of glacial acetic acid to a cellulose dispersion as described above does not improve the clarity of a film pressed from the dispersion at 120° C.

EXAMPLE X

Thirty parts of the finely divided cellulose fibers of Example I and 70 parts of aqueous 50% calcium thiocyanate are mixed to yield a nonpourable, particulate dispersion that is formed into a film by the procedure of Example IX. On drying, the film shrinks and pulls away from the frame. The dry film is translucent.

EXAMPLE XI

Fifteen parts of the finely divided cellulose fibers of Example I having a DP of 410 are vigorously shaken in a closed container with 85 parts of a 57% aqueous calcium thiocyanate solution which has been cooled to −10° C. The resulting fluid dispersion is warmed to 25° C. and allowed to stand for two hours, during which time it loses its fluidity and becomes a nonpourable, particulate dispersion. This dispersion is heated to 100° C. for one hour, then cooled, whereupon it forms a translucent, firm gel. This gel is spun into fibers in a press spinner under the following conditions: spinning temperature, 130° C.; spinning pressure, 110 lb./sq. in.; extrusion rate, 1.8 cc. per minute; spinnerette, 5 holes, each 7 mils in diameter; coagulating bath, 25% aqueous sodium chloride; windup speed, 75 feet/minute. The filaments are spun downward directly into air for a travel of 2½ inches and then into the coagulating bath. The filaments are converged one-half inch below the bath level and carried in the bath in a horizontal direction for a distance of 30 inches. The filaments are taken from the bath through a short travel in air to a windup bobbin. The yarn package is kept wet during the windup operation by slowly dripping 25% aqueous sodium chloride solution on it. After a package of yarn is collected, it is kept immersed in 25% aqueous sodium chloride solution for two hours and then in running water overnight to wash out the salts. The resulting gel yarn is given a four-turns-per-inch twist with care being taken to keep the yarn wet during this operation. The twisted yarn is air-dried overnight on the windup bobbin to prevent shrinkage during drying. The dried yarn is skeined and exposed in skein form to boiling water for 45 minutes. A shrinkage of 6.5% occurs and the yarn obtained has the following properties: D. P., 350; denier, 128; tenacity at 60% relative humidity, 1.4 g./denier at 15.5% elongation; wet tenacity, 0.7 g./denier at 16% elongation; modulus, 70 g./denier.

When water alone is used in place of the aqueous sodium chloride coagulating bath in the spinning operation described in the preceding paragraph, the gel filaments obtained are so weak that they cannot be wound up mechanically.

EXAMPLE XII

A particulate cellulose dispersion of 1 part of the finely divided cellulose of Example I, 9 parts of 57% aqueous calcium thiocyanate solution and 0.3 part of glacial acetic acid is prepared and converted into a gel as described in Example XI. This gel is spun into a monofil at 120° C. The resulting monofil is passed into a 25% aqueous sodium chloride coagulating bath, dried in a taut condition and then subjected to boiling water for 45 minutes and dried. The cellulose gel containing acetic acid is compared for spinnability with another cellulose gel prepared in the same way with the single exception that no acetic acid is used. The gel with no acetic acid is spun at 125° C. At the same spinning pressures the rate of extrusion of the gel containing acetic acid is considerably faster than the rate of extrusion of the gel with no acetic acid. The properties of the monofils obtained from these two spinnings are as follows:

| | Filament From Gel Without Acetic Acid | Filament From Gel Containing Acetic Acid |
| --- | --- | --- |
| Shrinkage on boiloff, percent | 8.8 | 7.7 |
| Denier | 973 | 535 |
| Tenacity (at 60% R. H.), g. p. d | 0.9 | 0.85 |
| Elongation (at 60% R. H.), percent | 38 | 23 |

These data indicate that the acetic acid has no very great adverse effect on the final monofil properties. The lower denier of the monofil obtained from the acetic acid-modified cellulose dispersion shows that it had a much lower viscosity during spinning. This is also evident from the greater extrusion rate of the acetic acid-modified dispersion.

A portion of the gel monofil obtained by spinning the dispersion into 25% aqueous sodium chloride coagulating bath is washed free of thiocyanate ion and then drawn to 1.7 times its original length, dried at room temperature in a taut condition, subjected to boiling water for 20 minutes and then dried. The properties of the drawn monofils obtained in this way from a dispersion containing acetic acid and from the dispersion containing no acetic acid are tabulated below.

| | Filament From Gel Without Acetic Acid | Filament From Gel Containing Acetic Acid |
| --- | --- | --- |
| Shrinkage on boiloff, percent | 5.3 | 5.3 |
| Denier | 584 | 311 |
| Tenacity (at 60% R. H.), g. p. d | 1.5 | 1.4 |
| Elongation (at 60% R. H.), percent | 13.2 | 10.0 |

EXAMPLE XIII

Forty parts of cotton linters having a degree of polymerization of 1400 are mixed with 360 parts of 57% aqueous calcium thiocyanate at −10° C. The resulting mixture is then heated for 30 minutes at 100° C., then cooled, giving a gel with a fibrous structure. This fibrous gel is then worked in a Banbury mixer at 100° C. for 15 minutes, then cooled. A dough is obtained which on cooling gives a gel which is free of fibers. The resultant gel is spun into filaments in a press spinner under the following conditions: spinning temperature, 135° C.; pressure, 150 lb./sq. in.; extrusion rate, 1.8 cc. per minute; spinnerette, 5 holes, each 7 mils in diameter; coagulating bath, 25% aqueous sodium chloride; windup speed, 30 feet/minute. The filaments are spun and processed as described in Example XI. A shrinkage of 7.5% occurs during the boiloff of the yarn. The boiled off yarn has the following properties: D. P., 1050; denier, 290; tenacity at 60% R. H., 1.45 g./denier at 15% elongation; wet tenacity, 0.5 g./denier at 21% elongation.

EXAMPLE XIV

Fifty parts of activated wood pulp (prepared as described below) having a degree of polymerization of 440 and containing 87.5% alpha-cellulose is mixed uniformly with 450 parts of an aqueous solution containing 56.7% calcium thiocyanate. The resulting mixture is worked in a Banbury mixer at 25° C. for 10 minutes, at 25° C. to 100° C. for 15 minutes and at 100° C. for 30 minutes, then cooled. The product obtained is a tough, rubbery, transparent, straw-colored gel. An unsoftened film is prepared from this gel by pressing between platens (having chromium-plated surfaces) of a hydraulic press at 120° C. for three minutes at a pressure of 200 lb./sq. in. The rubbery gel film, which is about three mils in thickness, is stripped from the platens and immersed in 25% aqueous sodium chloride for 20 minutes. It is then washed with water until the washings are free of thiocyanate ions. The gel film is squeegeed on a chromium plate, clamped in a frame and air-dried in a taut condition. The dry film obtained is about one mil thick and is bright and clear. The degree of polymerization (DP) of the cellulose in the film is 430.

A softened film is prepared from the gel above in the same manner the unsoftened film was except that after the excess water is pressed out by means of a squeegee, the film is immersed in an 8% aqueous glycerol solution for about 16 hours, the excess solution removed with a squeegee, and the film dried in a taut condition. The resulting film contains 20% glycerol by analysis.

The properties of the softened and unsoftened films are summarized in the following tables.

*Unsoftened films*

| Property (at 50% R. H.) | Film From Dispersion | Commercial Plain Unsoftened Cellophane |
| --- | --- | --- |
| Thickness, mils | 1.4 | 1.0 |
| Tear strength, g., dry | 22 | 3 |
| Tear strength, g., wet | 24 | 8 |
| Impact strength, kg.-cm | 12 | 10 |
| Flex life, cycles | 133 | 99 |
| Oxygen permeability, g./100 m.²/hr. | 12 | 4 |
| Water vapor permeability, g./100 m.²/hr. | 4,904 | 3,700 |
| Tensile strength, lb./sq. in | 14,000 | 13,000 |
| Elongation, percent | 8 | 7 |
| Modulus in tension, lb./sq. in | 903,000 | 1,400,000 |

*Glycerol softened films*

| Property (at 50% R. H.) | Film From Dispersion Containing 20% Glycerol | Commercial Moisture-proof Softened Cellophane |
| --- | --- | --- |
| Thickness, mils | 1.6 | 1.4 |
| Tear strength, g., dry | 30 | 7 |
| Impact strength, kg.-cm | 16 | 20 |
| Flex life, cycles | 210 | 700 |
| Modulus in tension, lb./sq. in | 101,000 | 300,000 |

The activated wood pulp used in this example is prepared as follows: wood pulp of the type used commercially for the manufacture of cellulose acetate, having a D. P. of 1400 and containing 96% alpha-cellulose, is treated as follows: To 63 parts of glacial acetic acid and 2 parts of acetic anhydride is added 16.6 parts of the wood pulp and the mixture stirred continually. After eight minutes, 20 parts of glacial acetic acid is stirred in and, after 38 minutes, a solution of 0.25 part of sulfuric acid in 12 parts of glacial acetic acid is added. Stirring is continued for an additional 30 minutes when 6 parts of acetic anhydride is added and stirring continued for an additional 45 minutes. The reaction mixture is washed free of acid with water, centrifuged and then treated for 24 hours with a solution of approximately 6 parts of potassium hydroxide in 175 parts of ethyl alcohol. During this time nitrogen is passed slowly through the mass of pulp to minimize oxidative degradation. Finally, the reaction mixture is neutralized with glacial acetic acid and allowed to stand for an hour after which the pulp is washed in running water for 48 hours to remove the acid. The pulp is then centrifuged and dried in air at room temperature.

EXAMPLE XV

Seventy-five parts of activated wood pulp (prepared as in Example XIV) having a D. P. of 440, is mixed uniformly with 425 parts of 57% aqueous calcium thiocyanate. The resulting mixture is then worked in a Banbury mixer for 30 minutes at 100° C. The resultant tough, rubbery, translucent gel is extruded under pressure at 130° C. through a single opening 0.032 inch in diameter. The resulting smooth monofil is led directly into a 25% aqueous sodium chloride coagulating bath, washed with water for 4 hours and air-dried on a bobbin. The dried monofil is immersed in boiling water for 45 minutes, which causes a shrinkage of about 8%. The resulting monofil has a dry tenacity of 0.86 g./denier at an elongation of 19% and a D. P. of 430.

EXAMPLE XVI

Forty-three parts of methylcellulose having a D. P. of 490 and containing 4.9% methoxyl is mixed uniformly with 357 parts of a 56.7% aqueous calcium thiocyanate solution. The resulting mixture is then worked in a Banbury mixer at 25° C. for 10 minutes, at 25–100° C. for 15 minutes, at 100° C. for 30 minutes, and then cooled. The product is a transparent, tough, rubbery, yellow-colored gel. A film is prepared from this gel by pressing it between platens with chromium-plated surfaces at 100° C. for three minutes at a pressure of 343 lb./sq. in. The rubbery gel film obtained, about three mils in thickness, is stripped from the platens and immersed in 25% aqueous sodium chloride for 20 minutes. It is next washed with water until the washings are free of thiocyanate ions. The gel film is squeegeed on a chromium plate, clamped in a frame and air-dried in a taut condition. The resulting film, 0.75 mil thick, is clear and bright, and at 50% R. H., has a tensile strength 10,500 lb./sq. in., 4% elongation, 726,000 lb./sq. in. modulus in tension, and 1.7 g. tear strength.

EXAMPLE XVII

Ten parts of wood pulp of the type used commercially for the manufacture of high tenacity viscose yarn, having a degree of polymerization of 870, and 90 parts of a 56.7% aqueous calcium thiocyanate solution are uniformly mixed together. This mixture is worked in a Banbury mixer at 100° C. for 15 minutes and then cooled. The product is a tough, rubbery, light brown translucent gel. A film is prepared from this gel by pressing between platens with chromium-plated surfaces at 120° C. for 3 minutes at a pressure of 858 lb./sq. in. The rubbery gel film obtained is stripped from the platens, immersed in 25% aqueous sodium chloride solution and then washed with water. The gel film obtained is squeegeed on a chromium plate, clamped in a frame and air-dried in a taut condition. The dry film is about one mil thick and is translucent. The degree of polymerization of the cellulose in the film is 690.

EXAMPLE XVIII

Sixty parts of activated good pulp prepared as described below and having a DP of 460, is mixed uniformly with 495 parts of an aqueous solution containing 56.7% calcium thiocyanate. The resulting mixture is worked in a Banbury mixer at 25° C. for 10 minutes, at 25° C.–100° C. for 15 minutes and at 100° C.–122° C. for 20 minutes, then cooled. The product obtained at this stage is a tough, rubbery, transparent, straw-colored gel. A film is prepared from this gel by pressing between platens (having chromium plated surfaces) of a hydraulic press at 120° C. for 3 minutes at a pressure of 294 lb./sq. in. The rubbery gel film, which is about 3 mils in thickness, is stripped from the platens and immersed in 25% aqueous sodium chloride for 20 minutes. It is then washed with water until the washings are free of thiocyanate ions. The gel film is squeegeed on a chromium plate, clamped in a frame, and air-dried in a taut condition. The dry film obtained is about 1 mil thick and is bright and clear. The properties of this film at 50% R. H. are as follows: tear strength, 24.4 grams dry and 26.6 grams wet; tensile strength, 12,000 lb./sq. in.; modulus in tension, 901,000 lb./sq. in.; elongation at break, 8%. The degree of polymerization of the cellulose in the film is substantially unchanged at 460.

The activated wood pulp used in this example is prepared by contacting wood pulp of the type used commercially for the manufacture of cellulose acetate, having a DP of 1400 and containing 96% alpha-cellulose, with dilute aqueous nitric acid. The treated pulp is washed free of acid with water, centrifuged, and dried in air at room temperature. The product has a DP of 460.

EXAMPLE XIX

Eight parts of regenerated cellulose powder (prepared as described below) having a degree of polymerization of 200 is mixed uniformly with 72 parts of an aqueous solution containing 56.7% calcium thiocyanate. The cellulose powder is placed in a glass vessel and deaerated by means of a water pump vacuum (about 15 mm. Hg pressure). The aqueous calcium thiocyanate is added to the glass vessel under vacuum. The resulting slurry is deaerated by means of a water pump and is next heated under vacuum at 100° C. for 45 minutes, and then cooled. The product obtained at this stage is a tough, rubbery, transparent, straw-colored gel. A film is prepared from this gel by pressing between platens (having chromium plated surfaces) of a hydraulic press at 120° C. for 3 minutes at a pressure of 190 lb./sq. in. The rubbery gel film, which is about 6 mils in thickness, is stripped from the platens and immersed in 25% aqueous sodium chloride for 20 minutes. It is then washed with water until the washings are free of thiocyanate ions. The gel film is next soaked in 8% aqueous glycerol overnight (about 16 hours). The softened gel film is squeegeed on a chromium plate, clamped in a frame, and air-dried in a taut condition. The dry film obtained is about 2 mils thick and is bright and clear. The properties of this film at 50% R. H. are as follows: tear strength, 28 grams dry and 18 grams wet; tensile strength, 5000 lb./sq. in.; modulus in tension, 212,000 lb./sq. in.; elongation at break, 39%. The softened film has a flex life of 427 cycles, an impact value of 18 kg.-cm. and a water vapor permeability of 7500 g./100 m²/hour.

The regenerated cellulose used in the above example is plain, unsized, transparent, unsoftened cellophane film made from viscose, and which has been reduced to a fine powder by grinding.

It will be understood that the above examples are merely illustrative and that the present invention broadly comprises a cellulose composition nonpourable at 25° C. and comprising, by weight, 1 to 3 parts of cellulose uniformly dispersed in 9 to 7 parts of an aqueous solution of calcium thiocyanate of 40% to 75% concentration, the cellulose having a degree of polymerization of at least 175, being water-insoluble, and having at least 2.5 free hydroxyl groups per glucose unit, and the process of preparing shaped articles including not only films and filaments but also rod, tubes, and molded articles of various shapes, by forming the cellulose dispersion into a shaped article at a temperature of 85° C. to 150° C. and a pressure of 10 lb./sq. in. to 1000 lb./sq. in. or more.

The proportions of cellulose, calcium thiocyanate, and water, the essential components, are critical in preparing the cellulose compositions of this invention. The operable proportions of these components, from the standpoint of this invention, can be clearly shown on a triangular diagram in which the proportions of cellulose, calcium thiocyanate, and water are expressed in percent of the combined weight of these three components.

Reference is made to the accompanying drawing which illustrates a triangular diagram as above based on wood pulp fiber compositions. In this system the operable proportions are from 10%–30% wood pulp cellulose, 34.4%–68.3% calcium thiocyanate, and 17.5%–54.6% water. Wood pulp compositions forming the solid compositions of this invention fall within the four sides of the trapezoidal figure shown on the triangular diagram.

Wood pulp compositions falling outside the area defined by the trapezoidal figure do not form shaped articles of satisfactory quality by means of pressure and heat as do the compositions inside this area. More specifically, compositions falling to the right of the trapezoid contain insufficient water to form a liquid solution of calcium thiocyanate, a liquid solution being convenient for mixing. Cellulose-calcium thiocyanate compositions lying above the top of the trapezoid are too dry to be handled satisfactorily in the formation of films and filaments. The cellulose particles in compositions lying to the left of the trapezoid do not coalesce satisfactorily on application of heat and pressure. Finally, those compositions lying below the bottom of the trapezoid have too low a gel strength to be handled mechanically in the formation of films and, even when formed into films by careful manual handling, the resulting dried films are quite brittle.

The critical nature of the minimum concentration of 10% cellulose is illustrated by the following:

A particulate dispersion of 7.4 parts of finely ground cellulose of the type used in Example I in 100.6 parts of 56.7% calcium thiocyanate solution, prepared in the same manner as the dispersion of Example VIII, is pressed between chromium-plated platens at 120° C. for three minutes at a pressure of 73 lb./sq. in. The gel film is stripped from the platens, immersed in 25% aqueous sodium chloride for a few minutes, and washed with water. The gel film is squeegeed on a chromium plate, clamped in a frame, and air-dried in a taut condition. As the film dries, it splits and cracks in all directions. Similarly, more dilute solutions of cellulose in 56.7% calcium thiocyanate give only brittle air-dried films. In an experiment, 2 parts of the finely divided cellulose of Example I and 98 parts of aqueous 56.7% calcium thiocyanate are cooled to —10° and thoroughly mixed by shaking in a glass container to form a dispersion. The resulting thin slurry is heated with stirring and at 78° C. the cellulose starts to dissolve and at 90° C. a thick syrup is formed. On cooling the syrup sets up to a brown, translucent gel. A film formed by spreading the hot cellulose solution on a chromium-plated surface to form a film five mils in thickness is heated for one minute at 150° C. The film, after stripping from the chromium-plated surface, is immersed in 25% aqueous sodium chloride and then washed with water. The gel film is cloudy and very weak. It tears so readily that only small areas can be dried in a taut condition and the air-dried portions are very brittle.

The minimum degree of polymerization of about 175 specified for the celluloses used in preparing the dispersions of this invention is also critical. Celluloses having degrees of polymerization less than 175 are not capable of producing tough strong films. As an illustration of this, a cellulose dispersion is prepared by mixing in a high speed mixer, 75 parts of ashless chromatographic cellulose powder (DP 140) with 450 parts of 56.7% calcium thiocyanate in water. At the age of one hour, for example, a small portion of the friable dispersion is pressed at 200 lb./sq. in. between aluminum foils (6" x 6") in a hydraulic press with platens at 112° C. The composition becomes very fluid so that some of it flashes out at the edges. After cooling and release of pressure, the sandwich is immersed in a 25% aqueous sodium chloride coagulating bath. Even under these conditions, the film is so weak that only small pieces can be stripped from the aluminum foil.

The values of degree of polymerization of cellulose (DP) given herein are calculated from the viscosity of the cellulose as follows. The absolute viscosity of a solution of cellulose in cupri-ethylenediamine is determined by TAPPI suggested method T-230 sm-46 (Paper Trade Journal 124, 37-41 (1947)), the solution being prepared as described for the falling ball method, but the viscosity actually being determined in a Cannon-Fenske viscometer. From the observed absolute viscosity is calculated the intrinsic viscosity [η], and the DP is calculated from [η] by the following formula:

$$DP = [\eta]^{1.105} \times 118.4$$

A wide variety of coagulating baths are useful in imparting improved properties to gel films and filaments produced from the cellulose compositions of this invention. From the standpoint of the improvement in properties of the coagulated films and fibers or other articles, the preferred coagulating baths are 25% aqueous sodium chloride, 25% aqueous calcium chloride, acetone, methanol and ethanol. From the standpoint of the recovery of materials, 25% aqueous sodium chloride is an especially preferred coagulating bath. The calcium thiocyanate dissolved in the coagulating bath and in the wash water can be recovered simply by evaporating the water from these solutions until the concentration of the calcium thiocyanate reaches 50 to 60%. At this concentration of calcium thiocyanate substantially all the sodium chloride crystallizes out and can be filtered off. The small amount of sodium chloride which remains in the concentrated aqueous solution of calcium thiocyanate (approximately 4% sodium chloride, based on weight of calcium thiocyanate, is the maximum soluble in a 57% aqueous calcium thiocyanate solution) does not interfere with the use of such solutions in the preparation of the cellulose compositions of this invention.

The cellulose compositions of this invention can be modified, if desired, by incorporating therein during their preparation such modifiers as plasticizers, pigments, inert fillers, polymers, copolymers and the like. Dilution of the cellulose compositions of this invention can be made with minor amounts of other salts, acids or bases in amounts that do not seriously reduce their formability and the strength of the formed articles. It is also possible to impregnate the cellulose gel films or filaments with softeners, plasticizers or dyes by immersing the gel film or filament in aqueous solutions of the desired softener or other modifier prior to the final drying step.

The present invention avoids serious difficulties which are inherent with the previously known methods of preparing shaped articles from cellulose compositions of various types. One of the disadvantages of the prior art methods is that the high temperatures and prolonged periods which were used for dissolving the cellulose in high enough concentration for practical use, cause considerable degradation of the cellulose. Consequently, the molecular weight or degree of polymerization of the cellulose in the final shaped article is too low to provide articles of the highest strength. On the other hand, shaped articles can be readily prepared by the instant process without decreasing the degree of polymerization of the cellulose used as the starting material more than a maximum of 30%.

Obviously, one method of avoiding the above mentioned difficulty in solution processes of the prior art would be to start with cellulose of such high molecular weight that the product, after the degradation of the cellulose incurred during processing, would still have a high enough molecular weight to provide good physical properties. However, this is not practical since cellulose of the very high starting molecular weight required for such use produces cellulose solutions too high in viscosity to be handled by prior art methods except in very low concentrations. On the contrary, the process of this invention causes little, if any, significant degradation of the cellulose, and, as has been illustrated, actually operates with ease with very high molecular weight cellulose. Consequently, the films and filaments obtained by its use have high molecular weight and good physical properties, and dispersions of high concentration, e. g., 10-30%, can be handled satisfactorily.

The following table indicates the relatively slight degradation of the cellulose in making films and filaments by the instant process as compared to the degradation of the cellulose in making cellophane by the conventional viscose process:

*Change in degree of polymerization of various types of cellulose processed to films or fibers via dispersion process*

| Type of Cellulose | DP of Cellulose | | Examples |
| --- | --- | --- | --- |
| | Initial | Film or Fiber | |
| Cotton linters | 1,400 | 1,050 | XIII |
| Wood pulp used in making high tenacity viscose yarn | 870 | 690 | XVII |
| Sulfuric acid activated wood pulp | 440 | 430 | XIV |
| Nitric acid activated wood pulp | 460 | 460 | XVIII |
| Ground, purified wood pulp | 410 | 350 | XI |
| Ordinary sulfite wood pulp used in making cellophane by viscose process | 690 | 200 | Cellophane |

The process of this invention also possesses a great practical advantage in that the calcium thiocyanate can be readily removed from the shaped articles by washing and recovered from the wash water for reuse in forming new cellulose dispersions.

The particulate cellulose dispersions of this invention have a further important advantage due to their ability to be formed directly into films, filaments, or the like, by means of heat and pressure without the necessity of first forming a solution of the cellulose as a separate step and then converting this solution to the desired form.

In addition to their use in the formation of shaped articles such as films and fibers, the cellulose compositions of this invention can also be applied to various substrates as a finish, can be coated on fabrics, and can also be used for the preparation of sponges.

As many apparently widely different embodiments of this invention may be made without departing from the spirit and scope thereof, it is to be understood that the invention is not limited to the specific embodiments thereof except as defined in the appended claims.

The invention claimed is:

1. A uniform, particulate cellulose dispersion non-pourable at 25° C. essentially consisting of water-insoluble cellulose particles having a degree of polymerization of at least 175 and at least 2.5 free hydroxyl groups per glucose unit, all dimensions of said particles being within the range of 0.1 to 300 microns, mixed with an aqueous calcium thiocyanate solution of 40% to 75% concentration in the proportions, by weight, of 1 to 3 parts of said cellulose to 9 to 7 parts of said aqueous calcium thiocyanate solution.

2. Process of preparing shaped articles of cellulose which comprises mixing at a temperature below 85° C. until a uniform, particulate dispersion nonpourable at 25° C. is obtained, water-insoluble cellulose particles having a degree of polymerization of at least 175 and at least 2.5 free hydroxyl groups per glucose unit, all dimensions of said particles being within the range of 0.1 to 300 microns, with an aqueous calcium thiocyanate solution of 40% to 75% concentration in the proportions, by weight, of 1 to 3 parts of said cellulose to 9 to 7 parts of said aqueous calcium thiocyanate solution, and forming said dispersion into a shaped article at a temperature of 85° C. to 150° C. and a pressure of at least 10 lb./sq. in., said cellulose being subjected to elevated temperatures for so limited a period that the degree of polymerization thereof is not decreased more than 30%.

3. Process of preparing shaped articles of cellulose which comprises mixing at a temperature below 85° C. until a uniform, particulate dispersion nonpourable at 25° C. is obtained, water-insoluble cellulose particles having a degree of polymerization of at least 175 and at least 2.5 free hydroxyl groups per glucose unit, all dimensions of said particles being within the range of 0.1 to 300 microns, with an aqueous calcium thiocyanate solution of 40% to 75% concentration in the proportions, by weight, of 1 to 3 parts of said cellulose to 9 to 7 parts of said aqueous calcium thiocyanate solution, heating said particulate dispersion to approximately 100° C., cooling to obtain a gel, and forming said gel into a shaped article at a temperature of 85° C. to 150° C. and a pressure of at least 10 lb./sq. in., said cellulose being subjected to elevated temperatures for so limited a period that the degree of polymerization thereof is not decreased more than 30%.

4. Process of preparing shaped articles of cellulose which comprises viscous milling, by weight, 1 to 3 parts of cellulose and 9 to 7 parts of an aqueous solution of calcium thiocyanate of 40% to 75% concentration, said cellulose having a degree of polymerization of at least 175, being water-insoluble, and having at least 2.5 free hydroxyl groups per glucose unit, at a temperature of at least 75° C. until an at least translucent mass results, and then forming said mass into a shaped article at a temperature of 85° C. to 150° C. and a pressure of at least 10 lb./sq. in., said cellulose being subjected to elevated temperatures for so limited a period that the degree of polymerization thereof is not decreased more than 30%.

References Cited in the file of this patent

UNITED STATES PATENTS

| | | |
|---|---|---|
| 1,301,652 | Clayton | Mar. 22, 1919 |
| 2,140,921 | Rein | Dec. 20, 1938 |

OTHER REFERENCES

Williams: Jour. Soc. Chem. Ind., 40 221T–224T, 1923, T. P. IS6.

Dubosc: "Rev. Prod. Chim," 26, 507–10 (1923), TPIR 454.